United States Patent

Munch

[15] 3,699,991
[45] Oct. 24, 1972

[54] SUPPLY CONNECTION MEANS FOR BLEED TYPE SENSING APPARATUS

[72] Inventor: Otto R. Munch, Milwaukee, Wis.

[73] Assignee: Johnson Service Company, Milwaukee, Wis.

[22] Filed: Aug. 28, 1970

[21] Appl. No.: 67,911

[52] U.S. Cl. .................................. 137/82, 137/557
[51] Int. Cl. ............................................ G05b 11/44
[58] Field of Search ..137/82, 83, 557; 73/37.5, 37.6, 73/37.7; 235/201 FS

[56] References Cited

UNITED STATES PATENTS

| | | | |
|---|---|---|---|
| 3,186,642 | 6/1965 | Silver | 137/82 X |
| 3,576,131 | 4/1971 | Calderazzo | 73/37.5 |
| 2,907,337 | 10/1959 | Bemporad | 137/83 |

Primary Examiner—Alan Cohan
Attorney—Andrus, Sceales, Starke & Sawall

[57] ABSTRACT

A pneumatic nozzle is connected by a line to a supply and load connection apparatus which includes a supply nozzle connected to an air source to establish a jet. A receiver nozzle is mounted in opposed aligned relation with the supply nozzle and includes a receiving orifice aligned with and spaced from the metering or supply orifice. The receiving orifice forms the apex of a conical diffuser which terminates in a connection to the line. The spacing of the receiving orifice defines a jet stream gap with an output chamber extending laterally outward therefrom. An output port connects the output chamber to a fluid logic system or other load. A pair of indicating plungers are mounted within cylinders projecting outwardly from the output chamber. One plunger is spring-loaded and moves outwardly at a selected minimum pressure level to indicate an "on" or positive signal condition. The other plunger is gravity-biased inwardly and indicates the "off" or minimum signal condition.

3 Claims, 4 Drawing Figures

PATENTED OCT 24 1972          3,699,991
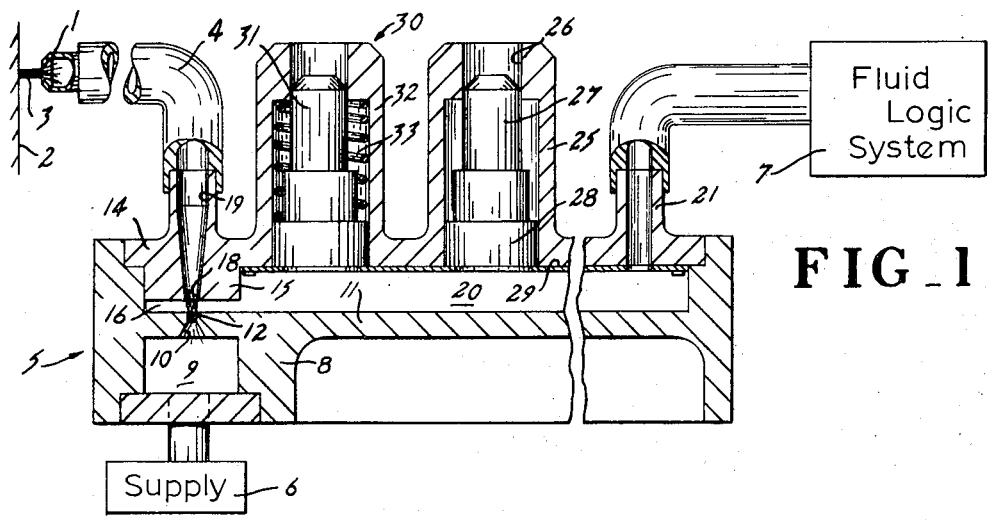
FIG_1
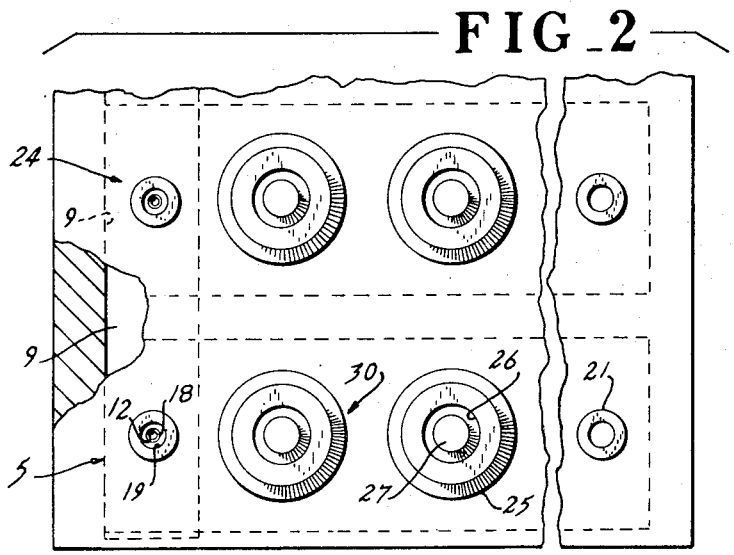
FIG_2
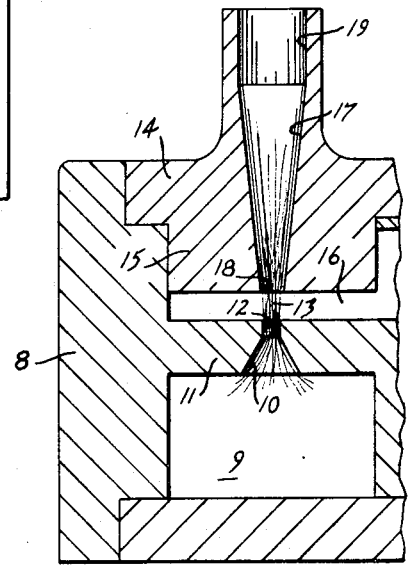
FIG_3
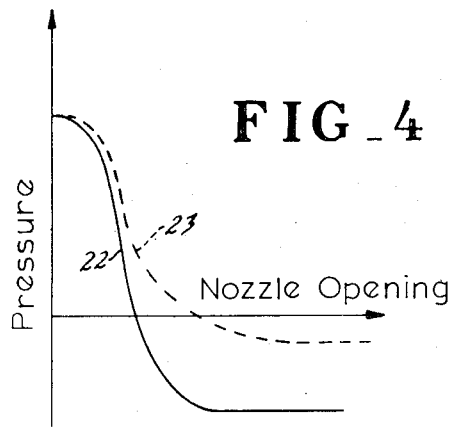
FIG_4
INVENTOR.
OTTO R. MUNCH
BY
Andrus, ceates, Parks, E. and M
Attorneys

3,699,991

SUPPLY CONNECTION MEANS FOR BLEED TYPE SENSING APPARATUS

BACKGROUND OF THE INVENTION

This invention relates to fluid sensing apparatus and particularly to a connection means for interconnecting of an exhausting pneumatic sensor to a fluid supply and to a load which are generally remote from the sensor.

Pneumatic and like systems are advantageously employed in various control, indicating and recording systems. Fluid sensing means such as pneumatic sensors are widely employed because of their relatively simple construction and versatile application. Generally, such sensing means includes a sensing port which is interconnected to a fluid supply through a connecting line. The output is taken between the fluid supply connection and the port. By varying the opening of the sensing port, the supply is variably exhausted and a back pressure in the line is correspondingly adjusted or varied to provide a related output in the output connection. Thus, with a large opening or bleed at the sensor port, the incoming fluid is exhausted through the sensing unit and a minimal output is established. As the sensing port is blocked, the air or other fluid employed cannot readily escape and a back pressure is created in the supply connection line, with a corresponding increased output pressure. With the bleed port completely blocked, the maximum output pressure is established. Such sensing means may be of the conventional back pressure sensing units, a spring-loaded lid port or the like. The characteristic of the system is dependent on the supply connection as a result of the flow-related pressure drop in the connecting line between the output connection and the sensing port. Further, if a relatively long connection line is employed, the output pressure cannot generally be reduced below a selected level such that a significant positive pressure is established even with the bleed port completely unrestricted or open. This is particularly undesirable when the output is connected to drive a load having a low threshold level and/or relatively high sensitivity.

In particular, applicant has found that the bleed-type sensing means is not readily applicable to fluid logic systems and the like where a plurality of the sensing means may be remotely located with respect to a common supply and output means. Further, when applied to certain fluid logic systems, the output pressure signal varies between a maximum and minimum level, and preferably reverses at a selected condition such as when the port approaches a completely open position. The prior art devices have generally not provided a reliable and sensitive apparatus for such applications.

SUMMARY OF THE PRESENT INVENTION

The present invention is particularly directed to an improved fluid system including a supply and load connection apparatus permitting a reversal in the pressure signal with the variation in the bleed port opening and further permitting relatively substantial remote location of the fluid sensor means with respect to the supply and load connection apparatus. Further, a visible indication of the output signal level may be established.

Generally, in accordance with the present invention, a three-dimensional venturi connection means includes an input orifice interconnected to a fluid source and a spaced output orifice and diffuser connected to the sensor connection line. The output or load is interconnected to the high velocity gap of the venturi means. In a particularly novel construction of the present invention, a supply nozzle or orifice is coupled to a fluid source to establish a fluid jet. A receiver is mounted in opposed aligned relation with the supply nozzle and includes a receiving orifice aligned with and spaced from the metering or supply orifice. The receiving orifice forms the apex of a conical diffuser which terminates in a sensor connecting port which is connected by the sensor connection line to the sensing port. The spacing of the receiving orifice defines an enclosed jet stream gap with an output chamber extending laterally outward therefrom. An output port is connected to the output chamber and interconnected to the desired load, such as a fluid logic system or any other fluid responsive device.

A pressure-responsive indicating means is coupled to the output chamber in accordance with another aspect of the present invention to provide an indication of the output signal level. A plunger-type indicator may include a piston slidably mounted within a cylinder projecting outwardly from the output chamber and forming an extension thereof. If the plunger is spring-loaded, the plunger moves outwardly at a selected minimum pressure level to indicate such positive pressure level. A free-floating piston may provide an indication of selected minimum pressure in the off or minimum-signal condition. A combination of such indicators coupled to the single output chamber can advantageously be employed such that the one indicator signals a sufficiently high signal in the "on" condition and the other indicator signals a sufficiently low signal in the "off" condition for the required application.

The present invention thus provides a simple and reliable connection means between a bleed-type sensing device and a remote supply and load connection in a manner permitting reduction of the minimum output pressure signal and, in fact, permitting changes in sign as well as amplitude in response to the opening of the sensing port.

BRIEF DESCRIPTION OF DRAWING

The drawing furnished herewith illustrates the preferred construction of the present invention in which the above advantages and features are fully disclosed as well as others which will be readily understood from the following description.

In the drawing:

FIG. 1 is a vertical section through a supply and load connecting apparatus constructed in accordance with the present invention and interconnected to bleed-type sensing means and to a fluid logic system as a load;

FIG. 2 is a plan view of the fluid supply and load connecting apparatus shown in FIG. 1;

FIG. 3 is an enlarged fragmentary view of a portion of FIG. 1 illustrating the relative relationship between the orifices in the supply and load connection apparatus; and FIG. 4 is a graphical illustration of output characteristics with changes in the sensing unit.

DESCRIPTION OF ILLUSTRATED EMBODIMENT

Referring to the drawing and particularly to FIG. 1, a back pressure sensing nozzle 1 is shown located adjacent an object 2 which may be a bleed port lid, an object to be detected and the like. The nozzle 1 is interconnected to a suitable fluid supply to establish a jet stream 3 directed toward and engaging the object 2. The upstream pressure within the nozzle 1 is related to the relative spacing of the object 2 with respect to the end of nozzle 1 and thus a pressure-sensitive device is created having a back pressure directly related to the position of the object. This is typical of bleed-type pneumatic sensing units, any other of which might equally be employed for purposes in connection with the present invention. A connecting line 4 interconnects the nozzle 1 to a fluid supply and load-connection apparatus 5 which particularly forms an embodiment of the present invention. The apparatus 5 interconnects the sensing line 4 to a suitable fluid supply 6 and to a load device 7. Although the nozzle 1 can be interconnected to any suitable fluid supply, an air supply to define a pneumatic system is preferable to permit venting of the nozzle 1 to the atmosphere and because of the ready and convenient means of supplying air and the like. The load device 7 can be any desired load but such as a controlled device, a recording device or the like. The load device 7 can, with the present invention, have a relatively low threshold and/or have a relatively high sensitivity and applicant has found it particularly useful in connection with fluidic logic systems. The back pressure sensing concept provides a high-quality input signal to the logic system which, with the present invention, may be constructed to change the sign of the output signal in response to opening and closing of the back pressure nozzle 1, as presently described.

The fluid supply 6 and the load device 7 have therefore been shown in block diagram and the sensing nozzle 1 has been diagrammatically shown. The present invention is particularly directed to the supply and load connection apparatus 5 which is presently described in detail.

More particularly, in the illustrated embodiment of the invention as shown most clearly in FIGS. 1–3, the connection apparatus 5 includes a body portion 8 of any suitable material. A supply channel 9 is formed in the bottom or underside of body portion 8 with a main supply nozzle 10 formed in the upper wall 11 of the supply channel 9. The nozzle 10 terminates in an orifice 12 of a selected size to establish an upwardly directed jet stream 13. The upper surface of body portion 8 is recessed and closed by a top closure wall 14 which is secured to the body 8 by suitable cap screws or the like. Wall 14 includes an inwardly projected portion 15 aligned with the supply nozzle 10 to define a control or pressure-sensing gap 16. The wall portion 15 includes a conical diffuser 17 having a receiving orifice 18 aligned with the orifice 12 of supply nozzle 10. The orifice 18 is larger than the orifice 12 and the conical diffuser 17 projects upwardly therefrom with the tapered sidewall expanding outwardly and terminating in a sensor-connecting port 19 to which the connecting line 4 is attached.

The top wall 14 is formed of a step construction to define an output chamber 20 extending outwardly from the one side of the sensing gap 16. An output port 21 couples the output chamber 20 to the load 7.

In the operation of the device, if the sensing nozzle 1 is blocked completely by the object 2, the flow and pressure from the supply nozzle 10 is diverted through the gap 16 into the output chamber 20 with a resulting maximum pressure buildup within the output chamber 20 and the connecting port 21. As the sensing nozzle 1 opens to allow exhausting or bleeding of the supply air to atmosphere or other reference, flow is transferred to the diffuser 17 and the pressure decreases. With nozzle 1 completely or essentially completely open, the supply jet 13 includes the total flow emitted from the nozzle 10 and the jet is received by the diffuser 17 with the creation of a relative negative pressure within the gap 16. This negative pressure will compensate for the pressure drop in the connecting tube or line 4 between the connecting port and the orifice of the sensing nozzle 1.

Generally, the pressure characteristic is typically as shown graphically in FIG. 4 wherein the output pressure in chamber 20 is shown along the vertical axis and the relative opening of the sensing nozzle 1 is shown along the horizontal axis. Trace or curve 22 is typical of the pressure variation with a relatively short connecting line 4 while a similar trace or curve 23 shows the effect of employing a substantially longer connecting line 4. In either construction, complete closure of the sensing nozzle 1 creates a maximum output pressure signal at the gap 16 and consequently chamber 20 and port 21. The maximum output pressure signal is, of course, independent of the length of the connecting line 4. As the bleed nozzle 1 opens to exhaust the supply of air, the output pressure drops and continues to drop as the bleed orifice defined by nozzle 1 opens, until the orifice is essentially completely open and a minimum pressure level is created. With either connecting line 4, the pressure level drops below the reference or atmospheric pressure in the illustrated pneumatic system. The effect of lengthening connecting line 4 is to reduce the negative pressure signal and the linearity of the output signal with the position of the bleed orifice. However, by proper selection of line 4 and nozzle 1, the minimum output signal is in the negative pressure region independently of the supply pressure and fan-out characteristic.

In accordance with a further aspect of the present invention, applicant has found that the conical diffuser chamber is preferably formed with an angle of approximately fourteen degrees. If a turbulent supply jet is established within the gap between the supply and receiving orifices, the length of the gap should be between one to two times the diameter of the supply orifice. If a relatively low input supply pressure is established with a resulting laminar flow, the free stream or jet gap should be from three to five times the diameter of the supply orifice. Further, the diameter of the receiving orifice should be approximately 25 percent larger than the diameter of the supply orifice. Although the relationships can vary, the operation of the system is generally adversely affected.

The present invention thus provides a characteristic which is particularly important where a plurality of sensing units are connected to remote locations and may require relatively long connecting lines between a common supply and the sensing means as such and where the output load has a low threshold and/or high sensitivity such as fluid logic systems.

The connection apparatus 5 may have a plurality of additional individual connecting sections connected to the supply channel as a common input such as shown in FIG. 2 as 24. The connection apparatus can be conveniently mounted in a centrally-located control cabinet or the like, with convenient connection of the several signal lines and output connections.

As previously noted, an indication of the pressure output level may be desired. In the illustrated embodiment of the invention, the connection apparatus 5 is to be mounted in the vertical position, as shown in FIG. 1. A cylindrical or tubular projection 25 is integrally formed in the top wall 14 of the housing to provide a piston chamber in communication with the output chamber 20. The upper end of the projection terminates in a reduced opening 26. An indicating plunger 27 is slidably mounted within the reduced opening 26 and includes an inner piston 28 mounted within the cylinder 25. The downward stroke of the piston 28 is limited by an apertured stop plate 29. Thus, with a negative pressure in the output chamber 20, the plunger 27 is retracted. With any significant pressure, depending mainly on the cross-sectional area and friction of the piston, the plunger 27 moves outwardly through the opening 26. This provides an indication of the establishment of a pressure above ambient. It thus provides an indication particularly useful in connection with indicating creation of a sufficiently low output pressure in the "off" condition, i.e., when the sensing nozzle has an essentially completely open bleed.

A high pressure indicator 30 may be similarly constructed with a plunger 31 disposed within a corresponding piston cylinder unit 34. A bias spring 33 encircles the plunger 31 within the cylinder and provides a relatively high pressure, resilient force urging the plunger 31 downwardly into the retracted position. The indicating plunger 31 will, therefore, only move outwardly when the pressure in the output chamber 20 rises above a selected positive level determined by the spring force and the piston area. This, then, provides an indication that a sufficiently high output signal pressure has been established in the "on" condition; i.e., with the sensing nozzle substantially or completely closed.

The combination of indicators provides an indication of the logic level in the output chamber. Such an indication would be particularly desirable for the system applied to a fluid logic system such as diagrammatically illustrated to provide an indication at a control center of the status at the several remote locations.

The present invention thus provides a highly-improved interfaced connection between the fluid supply and the sensing means or nozzle of the bleed type and, in particular, provides an improvement in establishing an improved range of operation with a reversal in the signal between the "on" and "off" conditions. The indication of the state of the unit is simply and reliably provided through pressure-indicating means mounted to respond to the pressure in the output chamber.

Various modes of carrying out the invention are contemplated as being within the scope of the following claims which particularly point out and distinctly claim the subject matter which is regarded as the invention.

I claim:

1. A fluid-sensing apparatus, comprising a fluid port means which is selectively opened and closed, a connecting passageway to said fluid port means, a connection means including a supply orifice and receiving orifice mounted in opposed aligned relation and defining a three-dimensional jet gap, said receiving orifice being connected to said passageway, a fluid-responsive output means including an output chamber projecting integrally of said gap and including an output port connected as an input to a fluid logic system, a cylinder wall means extending outwardly of said output chamber and terminating in a reduced opening, a plunger slidably mounted within the opening and having a piston slidably mounted within the cylinder wall and positioned outwardly in accordance with the pressure in said chamber, and a spring means urging said plunger inwardly toward said output chamber.

2. A fluid-sensing apparatus, comprising a fluid port means which is selectively opened and closed, a connecting passageway to said fluid port means, a connection means including a supply orifice and receiving orifice mounted in opposed aligned relation and defining a three-dimensional jet gap, said receiving orifice being connected to said passageway, an indicating means connected to an output chamber forming an extension of said gap, said indicating means including a tubular projection extending outwardly of the output chamber, a plunger means slidably mounted within the opening and forced outwardly in accordance with the pressure in said chamber, and a resilient means coupled to said plunger and urging said plunger inwardly against said pressure and thereby requiring a selected minimum output pressure.

3. The fluid-sensing apparatus of claim 2 wherein said indication means includes a second tubular projection extending vertically upwardly from the output chamber, a second plunger means slidably mounted within said second projection between an inward position and an outward position, said plunger means being positioned outwardly by the pressure in said output chamber, the second of said plunger means being essentially free-floating and responsive to any positive pressure in the output chamber to move said plunger means outwardly.

* * * * *